US009519490B2

(12) United States Patent
Vanturennout et al.

(10) Patent No.: US 9,519,490 B2
(45) Date of Patent: Dec. 13, 2016

(54) ADAPTIVE DATA SYNCHRONIZATION

(71) Applicant: Microsoft Corporation, Redmond, WA (US)

(72) Inventors: Jeroen Vanturennout, Snohomish, WA (US); Jason Wadsworth, Bellevue, WA (US); Yuanquan Zhang, Seattle, WA (US); Ranjib Singh Badh, Sammamish, WA (US); Hari Pulapaka, Redmond, WA (US); Alain Gefflaut, Kirkland, WA (US); Eyal Axelrod, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 473 days.

(21) Appl. No.: 13/788,684

(22) Filed: Mar. 7, 2013

(65) Prior Publication Data
US 2014/0258703 A1   Sep. 11, 2014

(51) Int. Cl.
*G06F 9/44* (2006.01)
*G06F 9/48* (2006.01)

(52) U.S. Cl.
CPC ........... *G06F 9/4406* (2013.01); *G06F 9/4887* (2013.01); *G06F 9/4893* (2013.01); *Y02B 60/144* (2013.01)

(58) Field of Classification Search
CPC .... G06F 9/4406; G06F 9/4887; G06F 9/4893; Y02B 60/144
See application file for complete search history.

(56) References Cited

U.S. PATENT DOCUMENTS

| 5,768,585 | A  | 6/1998  | Tetrick et al.     |
|-----------|----|---------|--------------------|
| 5,781,775 | A  | 7/1998  | Ueno               |
| 5,822,689 | A  | 10/1998 | Hwang              |
| 6,601,076 | B1 | 7/2003  | McCaw et al.       |
| 7,203,853 | B2 | 4/2007  | Martwick et al.    |
| 7,594,017 | B1 | 9/2009  | DiValentino        |
| 7,710,975 | B2 | 5/2010  | Commarford et al.  |

(Continued)

FOREIGN PATENT DOCUMENTS

| EP | 2207328 A1 | 7/2010 |
| EP | 2461536 A1 | 6/2012 |
| WO | 2008022973 | 2/2008 |

OTHER PUBLICATIONS

Kol, et al., "Adaptive Synchronization for Multi-Synchronous Systems", Retrieved at <<http://webee.technion.ac.il/people/ran/papers/KolGinosarAdaptSyncICCD1998.pdf>>, Computer Methods in Applied Mechanics and Engineering, 1994, pp. 12.

(Continued)

*Primary Examiner* — Thomas Lee
*Assistant Examiner* — Chad Erdman
(74) *Attorney, Agent, or Firm* — Anand Gupta; Tom Wong; Micky Minhas

(57) ABSTRACT

In one embodiment, an application module 114 may adjust a synchronization scheme 306 based on the operational state of a computing device 110. An operating system 112 may determine an operational state for a computing device 110. The operating system 112 may assign a synchronization allotment 304 to the application module 114 based on the operational state. A synchronization engine 116 of the application module 114 may implement a synchronization scheme 306 based on the synchronization allotment 304.

19 Claims, 7 Drawing Sheets

(56) References Cited

U.S. PATENT DOCUMENTS

| | | |
|---|---|---|
| 8,045,977 B2 | 10/2011 | McGuffin |
| 8,095,612 B2 | 1/2012 | Cowan et al. |
| 8,312,096 B2 | 11/2012 | Cohen et al. |
| 8,407,306 B1 | 3/2013 | Nerieri et al. |
| 2006/0155776 A1 | 7/2006 | Aust |
| 2008/0005249 A1 | 1/2008 | Hart |
| 2008/0005354 A1 | 1/2008 | Kryskow et al. |
| 2008/0049714 A1* | 2/2008 | Commarford ...... H04L 67/1095 370/350 |
| 2009/0282169 A1 | 11/2009 | Kumar et al. |
| 2009/0300169 A1* | 12/2009 | Sagar et al. .................. 709/224 |
| 2009/0307336 A1* | 12/2009 | Hieb ............................. 709/220 |
| 2009/0307696 A1* | 12/2009 | Vals et al. ..................... 718/102 |
| 2010/0121874 A1 | 5/2010 | Palay et al. |
| 2010/0228768 A1 | 9/2010 | Yamasuge et al. |
| 2010/0235431 A1 | 9/2010 | Poluri et al. |
| 2011/0131321 A1* | 6/2011 | Black ................... G06F 1/3203 709/224 |
| 2012/0030378 A1 | 2/2012 | Kaila et al. |
| 2012/0102139 A1 | 4/2012 | Tran et al. |
| 2012/0149352 A1 | 6/2012 | Backholm et al. |
| 2012/0173993 A1 | 7/2012 | Chakra et al. |
| 2012/0179896 A1 | 7/2012 | Salapura et al. |
| 2012/0221651 A1* | 8/2012 | Rabii ...................... H04L 51/38 709/206 |
| 2012/0233463 A1 | 9/2012 | Holt et al. |
| 2013/0013948 A1 | 1/2013 | Sengupta et al. |
| 2013/0060841 A1 | 3/2013 | Knight et al. |
| 2013/0198403 A1 | 8/2013 | Ward |
| 2013/0205001 A1* | 8/2013 | Reed ................... G06F 9/44505 709/224 |
| 2013/0212198 A1* | 8/2013 | Lin ......................... H04L 51/22 709/206 |
| 2014/0092757 A1* | 4/2014 | Xu et al. ........................ 370/252 |
| 2014/0095624 A1* | 4/2014 | Quan ............................. 709/205 |
| 2014/0289189 A1 | 9/2014 | Chan et al. |

OTHER PUBLICATIONS

"International Search Report & Written Opinion for PCT Application No. PCT/US2014/020059", Mailed Date: Jun. 4, 2014, Filed Date: Mar. 4, 2014, 9 Pages.

"Second Written Opinion Issued in PCT Application No. PCT/US2014/020059", Mailed Date: Jul. 20, 2015, 6 Pages.

"International Preliminary Report on Patentability Issued in PCT Application No. PCT/US2014/020059", Mailed Date: Oct. 16, 2015, 7 Pages.

Kol, et al., "Adaptive Synchronization for Multi-Synchronous Systems", Retrieved at <<http://webee.technion.ac.il/people/ran/papers/KoiGinosarAdaptSynciCCD1998.pdf>>, Computer Methods in Applied Mechanics and Engineering, 1994, pp. 12.

Vanturennout et al, "Adaptive Data Synchronization", U.S. Appl. No. 13/788,684, filed Mar. 7, 2013, 25 pages.

International Search Report and Written Opinion Issued in PCT Patent Application No. PCT/US2014/060211. Mailed Date: Feb. 4, 2015, 15 Pages.

Office Action issued in U.S Appl. No. 14/056,883, on Jun. 30, 2015, 21 pages.

Office Action issued in U.S Appl. No. 14/056,883, on Jan. 5, 2016, 21 pages.

Second Written Opinion Issued in PCT Application No. PCT/US2014/060211, Mailed Date: Aug. 25, 2015, 6 Pages.

International Preliminary Report on Patentability Issued in PCT Application No. PCT/US2014/060211, Mailed Date: Jan. 25, 2016, 10 Pages.

Notice of Allowance issued in US. Appl. No. 14/056,883, on Jul. 5, 2016, 8 pages.

* cited by examiner

100

ADAPTIVE DATA SYNCHRONIZATION

BACKGROUND

As more users start utilizing cloud services to store data that is continually updated over time, the stored data may be synchronized over multiple devices. A user may be using a smart phone, a tablet device, a laptop computer, a desktop computer, or other computing devices. Each of these devices may operate in changing circumstances, such as power level, activity level, network connection, and other factors. The user may want synchronization of data regardless of these changes in operating conditions.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to adjusting a synchronization scheme based on the operational state of a computing device. An operating system may determine an operational state for a computing device. The operating system may assign a synchronization allotment to an application module based on the operational state. The synchronization engine of the application module may implement a synchronization scheme based on the synchronization allotment.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
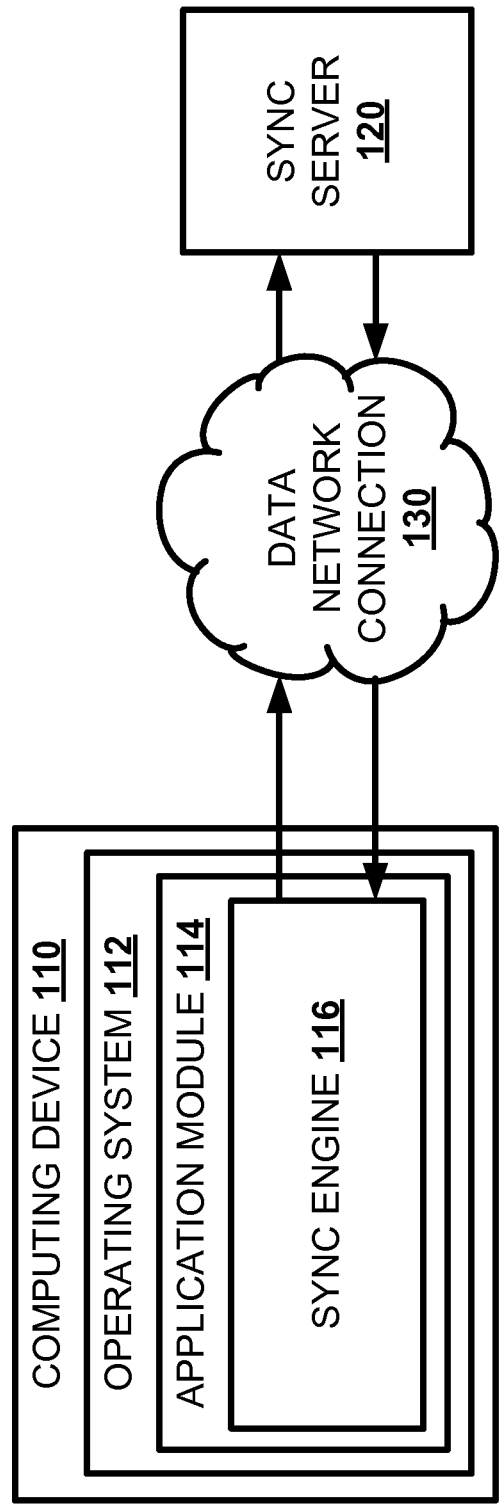
FIG. 1 illustrates, in a block diagram, one embodiment of a data network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a synchronization manager for a computing device.

Data synchronization programs have traditionally not adapted behavior based on different device form factors and code execution costs, potentially negatively impacting the user experience. Data synchronization implementations may tend to be device specific. If a data synchronization implementation spans multiple device types, that implementation may be designed to work on the least resource robust platform. By focusing the implementation on the lowest common denominator, the user may be cheated out of a richer user experience.

A data synchronization implementation may use computing resources to execute, such as processing, storage, and network capabilities. Each resource may impact battery life and network bandwidth. Additionally, the resource availability of computing device may change over time. Adapting sync behavior according to an overall cost impact may allow for a single synchronization implementation to scale across device types and operating conditions, providing users the best available experience both with respect to functionality and resource usage.

An operating system may map various operational state factors into a synchronization allotment of synchronization resources, allowing an application to use a limited set of synchronization resources. A state module of an operating system may use various algorithms for determining the operational state of executing code based on various inputs which affect that operational state, such as power, network connection, processor usage, and other operating conditions. Each operational state factor may be classified into levels. For example, a power state may be described as low cost when plugged into a power grid, medium cost when on battery power with the screen on, and high cost when on battery power with the screen off. The operating system may differentiate between application modules, assigning different synchronization allotments to different application modules.

Defining an operational state at the operating system level may allow an application to determine the optimal synchronization approach based on the available resources. Centralizing the resource determination at the operating system may free the application from having to be aware of the actions of other applications. Centralizing the resource determination also may free the application from tracking the resources and characteristics to determine the operational state.

Once the application has received a synchronization allotment from the operating system, the application may then select a synchronization scheme that optimally uses the available synchronization resources. The synchronization scheme describes the procedures to be followed by the synchronization engine to scale a synchronization protocol based on the allotment during synchronization, such as the timing of synchronizations, frequency of synchronizations, scope of synchronizations, and duration of synchronizations. The synchronization engine may implement the synchronization scheme without affecting the underlying synchronization protocol. A synchronization protocol is a set of networking rules used for synchronization of an application, such as Internet Message Access Protocol (IMAP), Exchange ActiveSync (EAS) or Post Office Protocol, version 3 (POP3). An application may determine the scope of the data to be synchronized more frequently, the scope of the notifications, or the frequency and duration of the synchronization sessions. For example, a business communication software may synchronize a calendar module and a mail module frequently while synchronizing a contacts list less often. Various mail folders within a mail module may be synchronized more frequently than others.

Further, the synchronization engine of the application may adjust the synchronization scheme based on the data load used by the synchronization. For example, if the computing device is on a priced network with a high cost for data traffic, the synchronization engine may delay large data synchronizations until a connection is made with a cheaper network. A tablet may use a limited synchronization while mobile and connected to a cellular data network, then provide a richer synchronization when connected to the user's local area network while plugged into the power grid.

Further, the application may adjust to changes in the device operational state. The operating system may monitor the device operational state and adjust the synchronization allotment of the application as circumstances change. The application may then adjust the synchronization schemes accordingly. Further, the application and the operating system may both monitor the application state, determining whether an application is under active use, executed in the background, or dormant. As the application state changes, the synchronization allotment and synchronization scheme may be altered.

Thus, in one embodiment, an application module may adjust a synchronization scheme based on the operational state of a computing device. An operating system may determine an operational state for a computing device. The operating system may assign a synchronization allotment to the application module based on the operational state. The synchronization engine of the application module may implement a synchronization scheme based on the synchronization allotment.

FIG. 1 illustrates, in a block diagram, one embodiment of a data network 100. A computing device 110 may execute an operating system 112. An operating system 112 is a set of software applications that manage the use of hardware resources by an application module 114, as well as interactions between application modules 114. An application module 114 is a software application, or an aspect of a software application.

The application module 114 may manage a local set of data for the user that may be synchronized with a remote set of data stored on the cloud. The application module 114 may have a synchronization engine (sync engine) 116 that synchronizes the local data set with the cloud data set. The synchronization engine 116 may connect to a synchronization server (sync server) 120 via a data network connection 130. The synchronization server 120 may refer to a single server or a distributed set of servers that may access the cloud data set. The data network connection 130 may be an internet connection, a wide area network connection, a local area network connection, or other type of data network connections. The synchronization engine 116 may alert the synchronization server to any adjustments to the synchronization scheme or receive any synchronizations over the data network connection 130.

Figure 2:
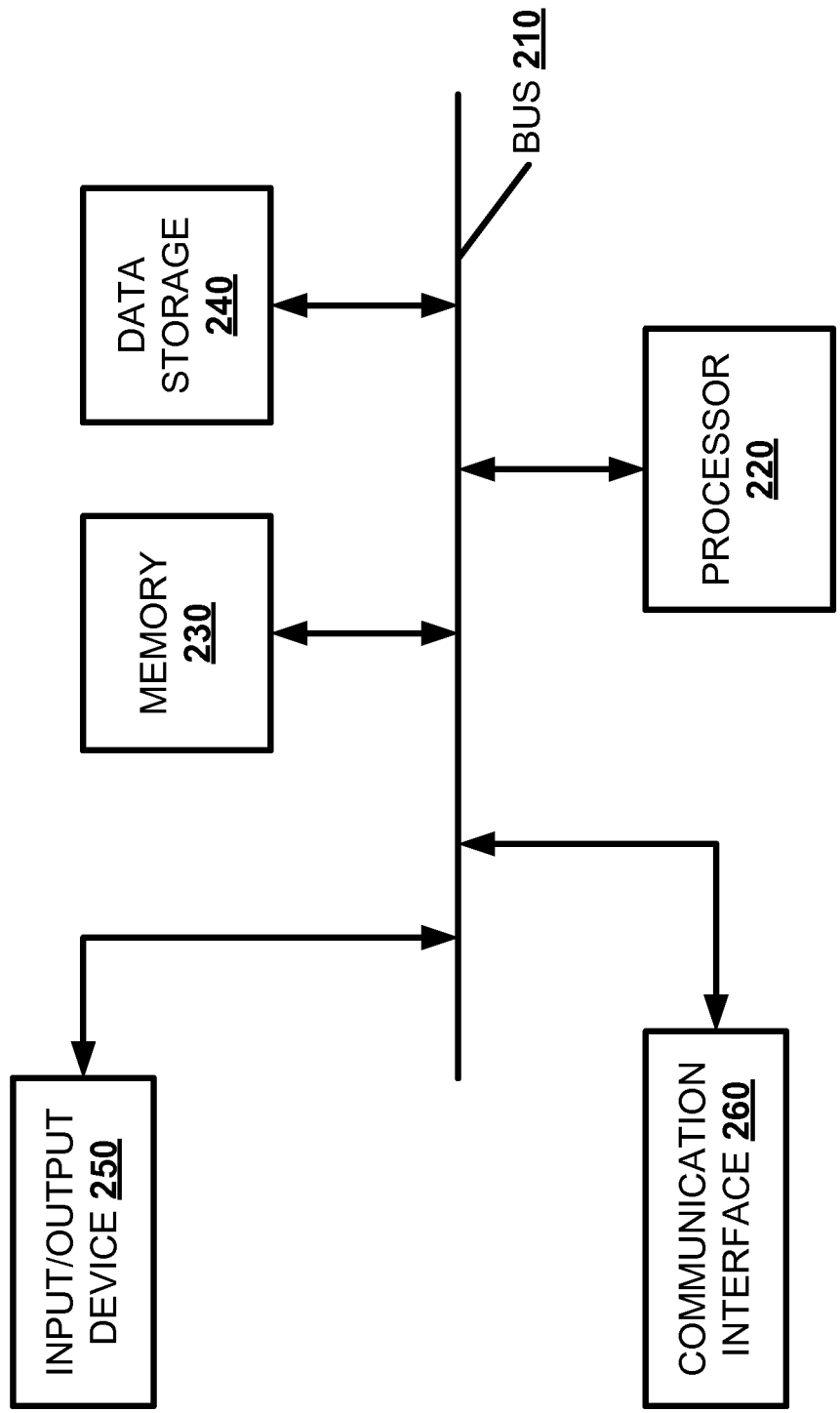
FIG. 2 illustrates, in a block diagram, one embodiment of a computing device.

FIG. 2 illustrates a block diagram of an exemplary computing device 200 which may act as a synchronization manager. The computing device 200 may combine one or more of hardware, software, firmware, and system-on-a-chip technology to implement a synchronization manager. The computing device 200 may include a bus 210, a processor 220, a memory 230, a data storage 240, an input/output device 250, and a communication interface 260. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
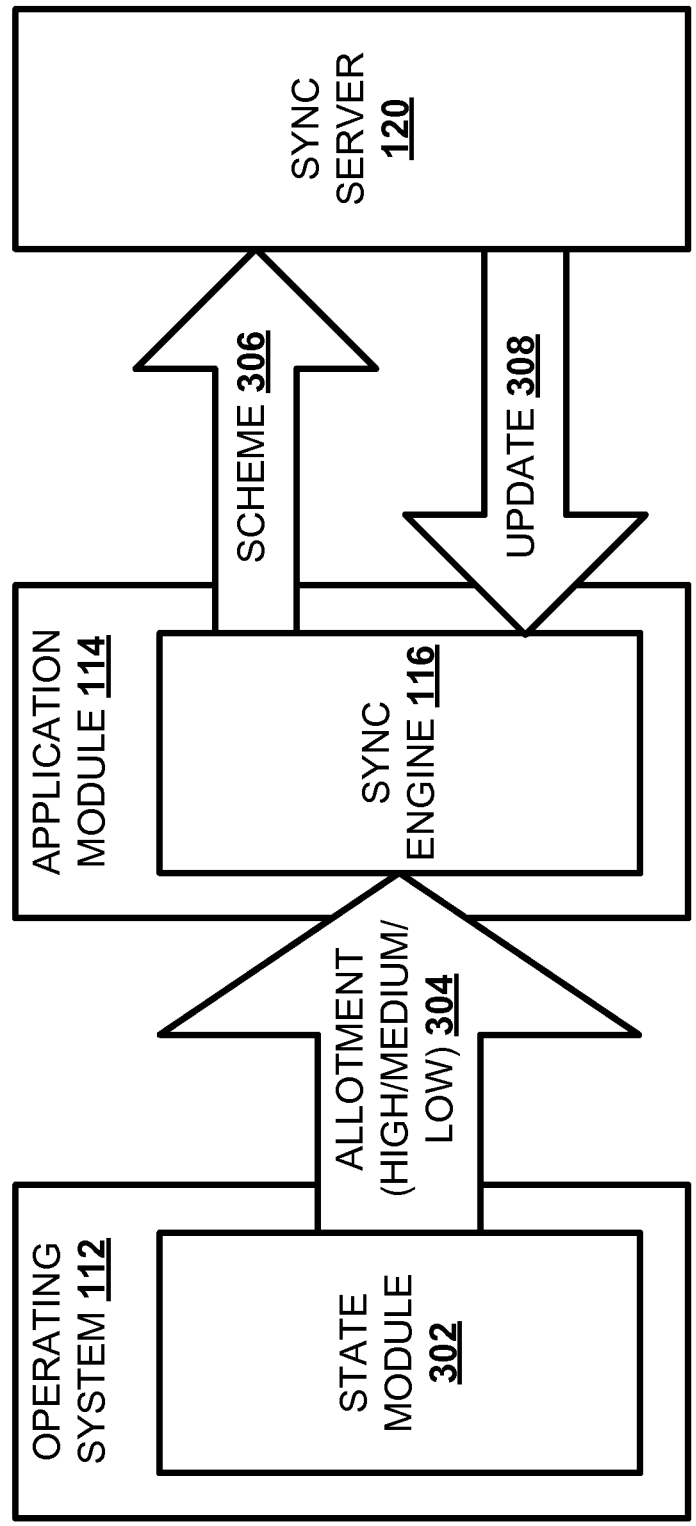
FIG. 3 illustrates, in a block diagram, one embodiment of a software architecture for the computing device.

FIG. 3 illustrates, in a block diagram, one embodiment of a software architecture 300 for the computing device 110. An operating system 112 may have a state module 302 that determines an operational state for a computing device 110. The operational state may factor in a power state, a screen state, a network state, a budget state, a processing state, or other operational descriptors of the computing device 110. A power state describes the source of power for the computing device 110, such as a power grid or a battery. The screen state describes the brightness level of the display screen for the computing device 110, such as high, low, or off. A network state describes the connectivity of the computing device 110 to a data network, as well as the type of network. A budget state describes if any of the resources of the computing device 110 is budgeted, such as a battery budget or a network budget. A processing state describes the usage of the processing power of the computing device 110.

The state module 302 may send a synchronization allotment 304 to the application module 114. The synchronization allotment 304 alerts the application module 114 as to the amount of synchronization resources available for use by an application module 114. The synchronization allotment 304 may be presented as a gradient or as a packetized set of levels, such as high level allotment, a medium level allotment, or a low level allotment.

The synchronization engine 116 of the application module 114 may then adjust a synchronization scheme 306 based on the synchronization allotment 304. The synchronization scheme 306 describes the rules for synchronizing the local data set with the cloud data set. The synchronization scheme 306 may describe a synchronization scope, a synchronization schedule, a synchronization duration, a synchronization data quota, and other metrics. A synchronization scope may describe specific sub-modules that are to be synchronized during a synchronization session. A synchronization schedule may describe the timing and frequency of synchronization. The synchronization duration describes the length of time for a synchronization session. The synchronization data quota describes the amount of data sent during a synchronization session. The synchronization server 120 may send a synchronization update 308 to the synchronization engine based on the synchronization scheme 306 provided by the synchronization engine 116.

Figure 4:
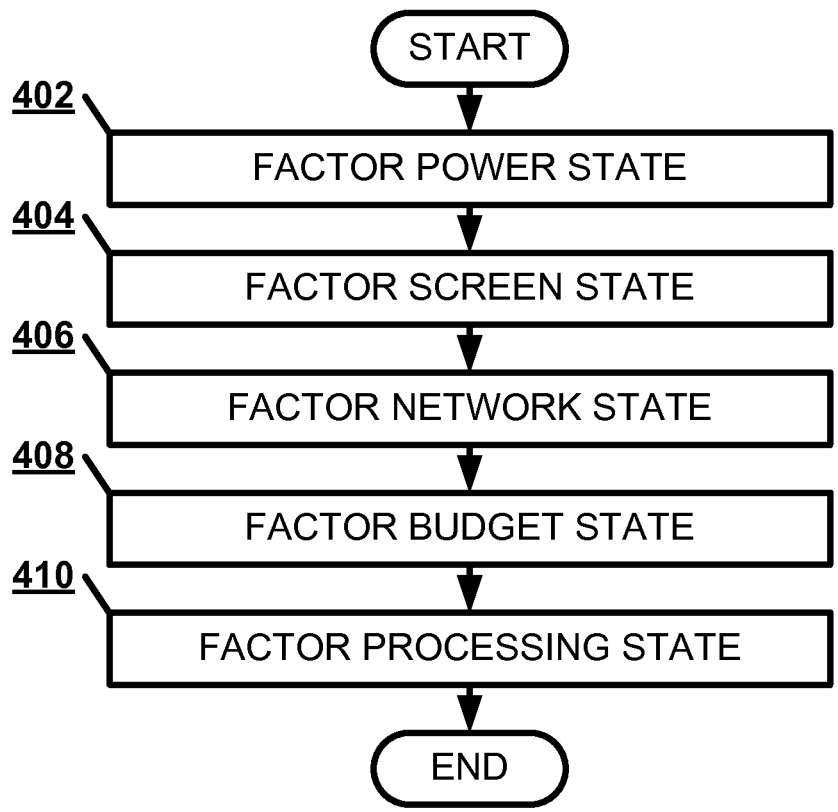
FIG. 4 illustrates, in a flowchart, one embodiment of a method of determining an operational state of the computing device with the operating system.

FIG. 4 illustrates, in a flowchart, one embodiment of a method 400 of determining an operational state of the computing device 110 with the operating system 112. The state module 302 of the operating system 112 may factor a power state into the operational state (Block 402). The state module 302 may factor a screen state into the operational state (Block 404). The state module 302 may factor a network state into the screen state (Block 406). The state module 302 may factor a budget state into the operational state (Block 408). The state module 302 may factor a processing state into the operational state (Block 410).

Figure 5:
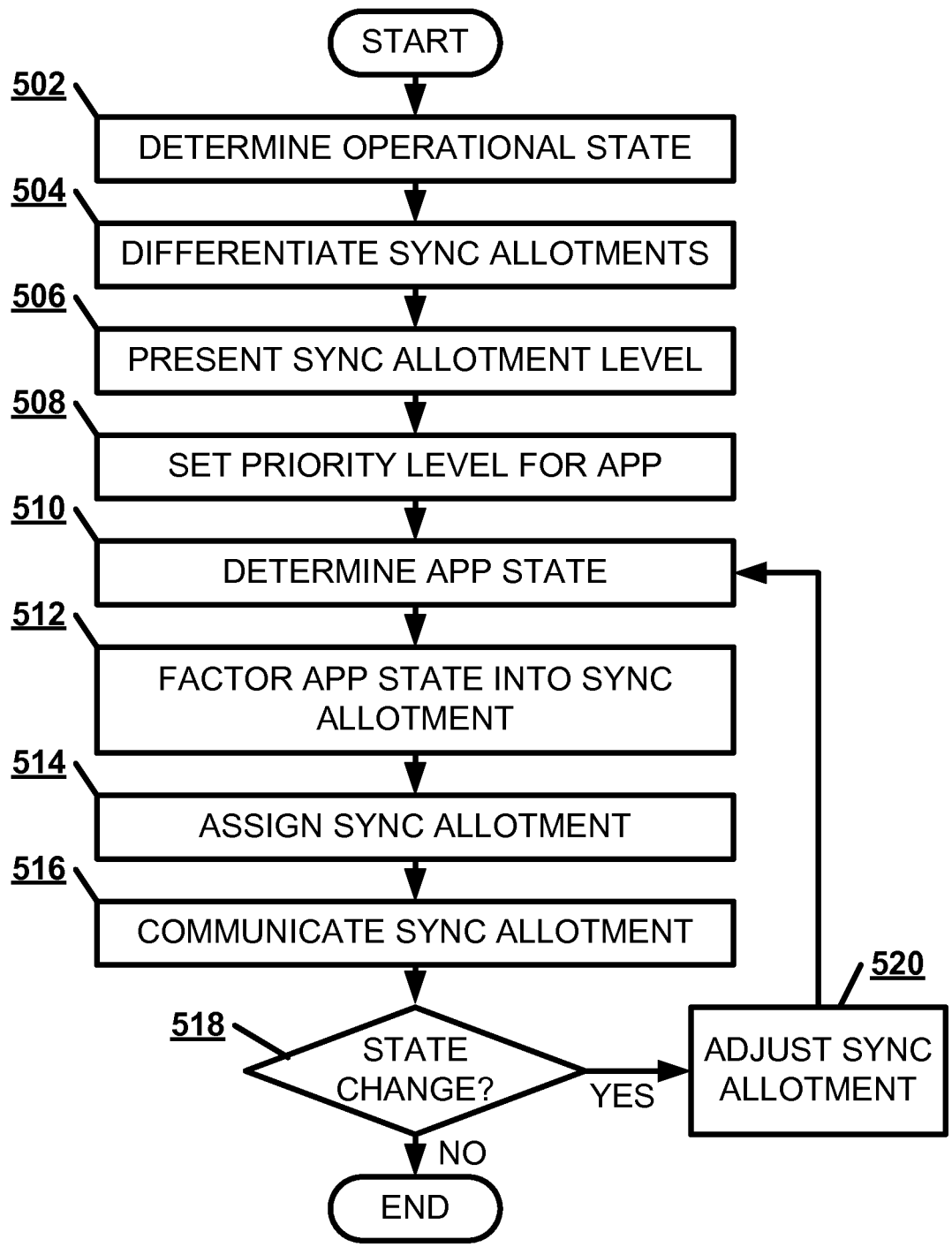
FIG. 5 illustrates, in a flowchart, one embodiment of a method of setting a synchronization allotment for an application module.

FIG. 5 illustrates, in a flowchart, one embodiment of a method 500 of setting a synchronization allotment 304 for an application module 114. The operating system 112 may determine an operational state for a computing device 110 (Block 502). The operating system 112 may differentiate synchronization allotments 304 between application modules 114, such as differentiating a synchronization allotment 304 for an application module 114 from an ancillary synchronization allotment 304 for an ancillary application module 114 (Block 504). Under differentiation, an ancillary application module 114 may receive a higher or lower synchronization allotment 304 than the synchronization allotment 304 for the application module 114. The operating system 112 may present the synchronization allotment 304 as at least one of a high level allotment, a medium level allotment, or a low level allotment (Block 506). The operating system 112 may set a priority level for the application module 114, describing which application module generally receives synchronization first (Block 508). A user or a developer may set the priority level for the application module 114. The operating system 112 may determine an application (APP) state for the application module 114 (Block 510). The application state describes the activity level of the application module 114, such as active, background, or dormant. The operating system 112 may factor the application state into the synchronization allotment 304 (Block 512). The operating system 112 may assigning a synchronization allotment 304 to an application module 114 based on the operational state (Block 514). The operating system 112 may communicate the synchronization allotment 304 to the application module 114 (Block 516). If the state module 302 identifies a state change for the operational state (Block 518), the operational system 112 may adjust the synchronization allotment 304 based on the state change for the operational state (Block 520).

Figure 6:
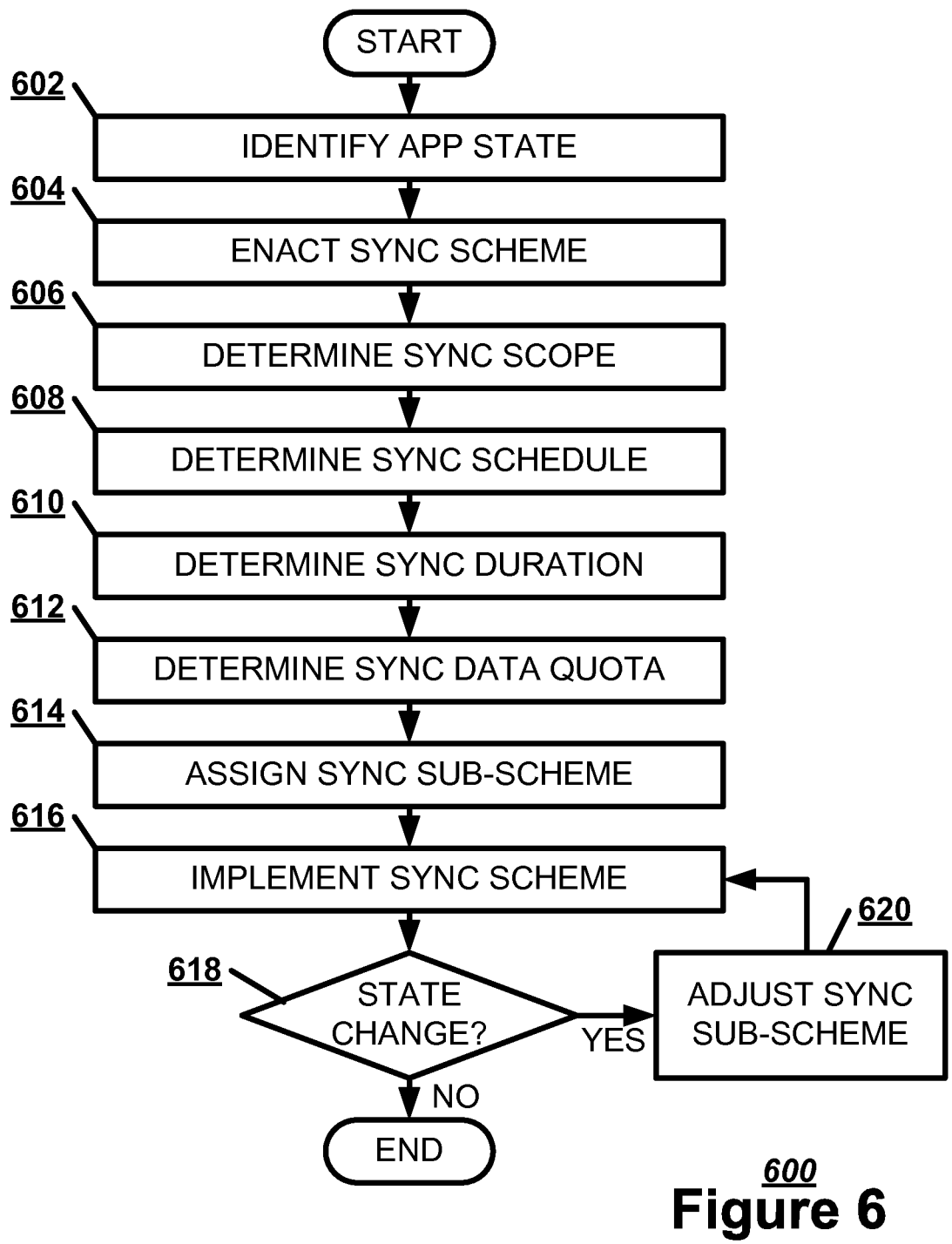
FIG. 6 illustrates, in a flowchart, one embodiment of a method of determining a synchronization scheme for an application module.

FIG. 6 illustrates, in a flowchart, one embodiment of a method 600 of implementing a synchronization scheme 306 for an application module 114. The application module 114 may identify the application state (Block 602). A synchronization engine 116 of the application module 114 may enact a synchronization scheme 306 based on a synchronization allotment 304 received from an operating system 112 (Block 604). The application module 114 may determine a synchronization scope for the synchronization engine 116 based on the synchronization allotment (Block 606). The application module 114 may determine a synchronization schedule for the synchronization engine 116 based on the synchronization allotment (Block 608). The application module 114 may determine a synchronization duration for the synchronization engine 116 based on the synchronization allotment (Block 610). The application module 114 may determine a synchronization data quota for the synchronization engine 116 based on the synchronization allotment (Block 612). The application module 114 may assign synchronization sub-schemes for each application sub-module 114, such as assigning a primary synchronization sub-scheme for a primary application sub-module and an ancillary synchronization sub-scheme for an ancillary sub-module based on the synchronization allotment 304 (Block 614). An application sub-module is an aspect of an application module 114, such as a mail function and a calendar function for a business communication program. For example, the synchronization sub-scheme for the mail function may differ from the synchronization sub-scheme for the calendar function. The synchronization engine 116 of the application module 114 may implement the synchronization scheme 306 for the application module 114 based on the synchronization allotment (Block 616). If a change occurs to the application state of the application module 114 (Block 618), the application module 114 may adjust the primary synchronization sub-scheme and the ancillary synchronization sub-scheme based on a change to the application state to reflect the new application state (Block 620).

Figure 7:
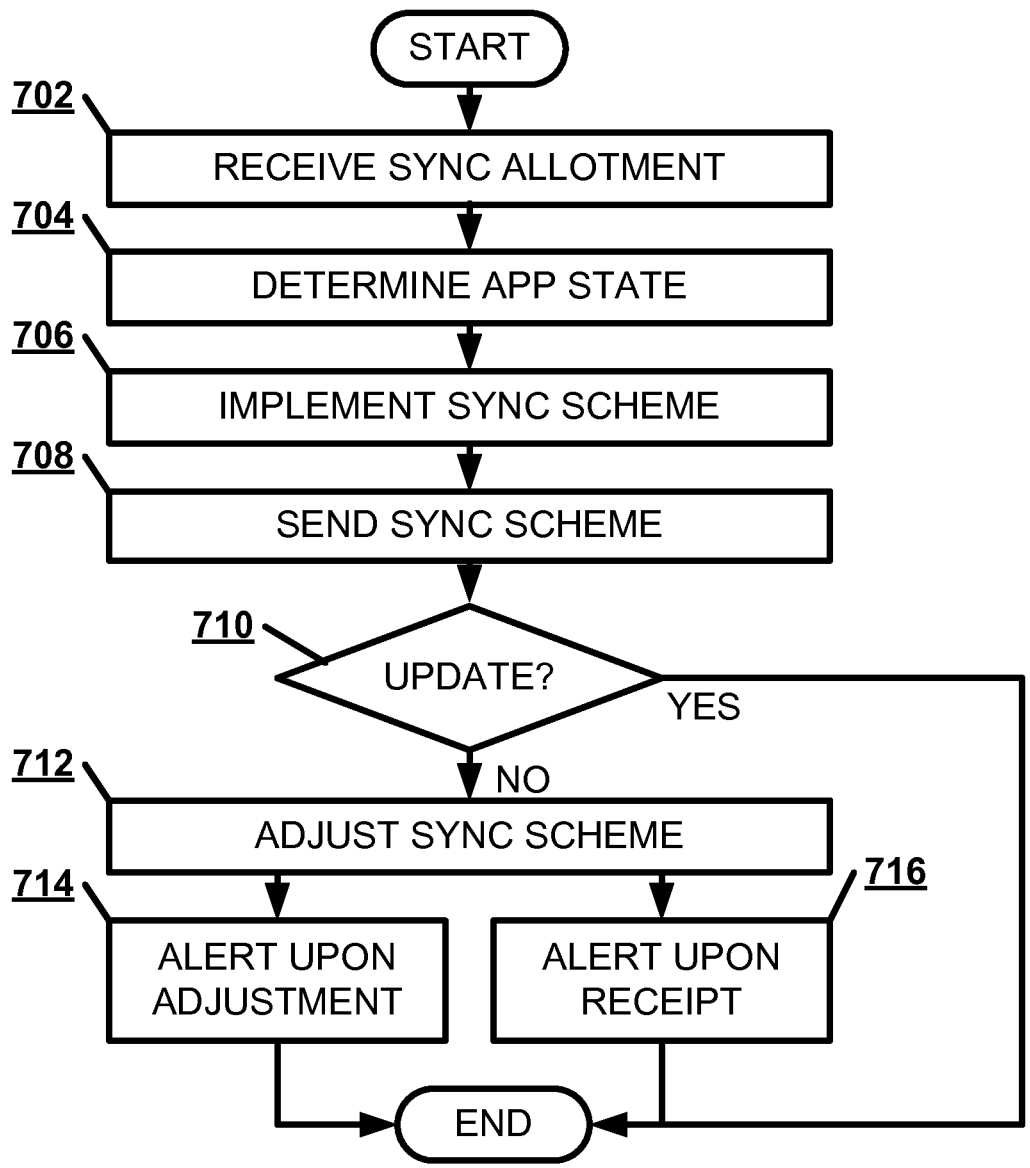
FIG. 7 illustrates, in a flowchart, one embodiment of a method of establishing a synchronization scheme with a synchronization server.

FIG. 7 illustrates, in a flowchart, one embodiment of a method 700 of establishing a synchronization scheme 306 with a synchronization server 120. The application module 114 may receive from an operating system 112 a synchronization allotment 304 based on an operation state of a computing device 110 (Block 702). The application module 114 may determine an application state for the application module (Block 704). The synchronization engine 116 of the application module 114 may implement the synchronization scheme 306 for the application module 114 based on the synchronization allotment 304 (Block 706). The synchronization engine 116 of the application module 114 may send the synchronization scheme 306 to the synchronization server 120 (Block 708). If the application module 114 receives an updated synchronization allotment 304 from the operating system 112 upon a change to the operational state (Block 710), the synchronization engine 116 of the application module 114 may adjust the synchronization scheme 306 based on the updated synchronization allotment 304 (Block 712). The synchronization engine 116 of the application module 114 may alert the synchronization server 120 to an updated synchronization scheme 306 upon adjusting the synchronization scheme 306 (Block 714). Alternately, the synchronization engine 116 of the application module 114 may execute a lazy synchronization scheme update, alerting the synchronization server 120 to a synchronization scheme 306 upon receiving a synchronization update 308 from the synchronization server 120 (Block 716).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A method implemented by a computing device having a display screen and a processor executing instructions to provide an operating system, comprising:
    determining an operational state of the computing device using the operating system, the operational state representing an amount of synchronization resources available at the computing device based on a combination of one or more of a power state describing a source of power provided to the computing device, a screen state describing a brightness level of the display screen, a network state describing connectivity type of the computing device to a data network, or a processing state describing usage of a processing power of the computing device;
    mapping first and second portions of the amount of synchronization resources into a first synchronization allotment and a second synchronization allotment that is different than the first synchronization allotment; and
    assigning the first and second synchronization allotments to first and second application modules based on first and second priority levels associated with the first and second application modules, respectively, the assigned first and second synchronization allotments alerting the first and second application modules as to the first and second portions of the amount of synchronization resources available for use by the first and second application modules, respectively.

2. The method of claim 1, further comprising:
    setting the first and second priority levels for the first and second application modules.

3. The method of claim 1, further comprising:
    determining an application state for each of the first and second application modules.

4. The method of claim 1, further comprising:
    determining an application state for each of the first and second application modules;
    and determining the operational state includes determining the operational state based on the determined application states associated with the first and second application modules.

5. The method of claim 1, further comprising:
    communicating the first and second synchronization allotments to the first and second application modules, respectively.

6. The method of claim 1, further comprising:
    identifying a state change for the determined operational state.

7. The method of claim 1, further comprising:
    identifying a state change for the determined operational state; and
    adjusting at least one of the first or second synchronization allotment based on the identified state change for the operational state.

8. The method of claim 1, further comprising:
    differentiating the first and second synchronization allotments for the first and second application modules based on a corresponding execution characteristic of the first and second application modules.

9. The method of claim 1, wherein determining the operational state includes:

determining the operational state based on at least two of the power state, the screen state, the network state, or the processing state.

10. The method of claim 1, further comprising:
presenting the first or second synchronization allotment as at least one of a high level allotment or a low level allotment.

11. A computing device, comprising:
a processor;
a display screen operatively coupled to the processor; and
a memory containing instructions executable by the processor to cause the processor to perform a process including:
monitoring one or more of a power state describing a source of power provided to the computing device, a screen state describing a brightness level of the display screen, a network state describing connectivity type of the computing device to a data network, or a processing state describing usage of a processing power of the computing device;
determining an amount of synchronization resources available at the computing device based on the monitored one or more of the power state, the screen state, the network state, or the processing state of the computing device;
dividing the determined amount of synchronization resources into a first synchronization allotment and a second synchronization allotment that is different than the first synchronization allotment; and
assigning the first and second synchronization allotments to first and second application modules based on first and second priority levels associated with the first and second application modules, respectively, the assigned first and second synchronization allotments allowing the first and second application modules to consume a corresponding portion of the amount of synchronization resources available at the computing device.

12. The computing device of claim 11 wherein monitoring one or more of the power state includes determining whether the computing device is on battery power or is connected to a power grid.

13. The computing device of claim 11 wherein the process further includes:
determining an application state for each of the first and second application modules, the application state includes under active use, executing in background, or dormant; and
determining the amount of synchronization resources includes determining the amount of synchronization resources based on the determined application states associated with the first and second application modules.

14. The computing device of claim 11 wherein the process further includes:
identifying a change in one or more of the monitored power state, screen state, network state, or processing state; and
updating the amount of synchronization resources available at the computing device based on the identified change.

15. The computing device of claim 11 wherein the process further includes:
identifying a change in one or more of the monitored power state, screen state, network state, or processing state;
updating the amount of synchronization resources available at the computing device based on the identified change; and
adjusting at least one of the first or second synchronization allotment based on the updated amount of synchronization resources available at the computing device.

16. The computing device of claim 11 wherein the process further includes:
identifying a change in one or more of the monitored power state, screen state, network state, or processing state;
updating the amount of synchronization resources available at the computing device based on the identified change; and
increasing at least one of the first or second synchronization allotment based on the updated amount of synchronization resources available at the computing device.

17. A method implemented by a computing device having a display screen and a processor executing instructions to provide an operating system, comprising:
receiving, from the operating system, a synchronization allotment indicating an amount of synchronization resources allowed to be consumed by an application module, the amount of synchronization resources being a portion of a total amount of synchronization resources available at the computing device based on a combination of one or more of a power state describing a source of power provided to the computing device, a screen state describing a brightness level of the display screen, a network state describing connectivity type of the computing device to a data network, or a processing state describing usage of a processing power of the computing device;
scaling a synchronization protocol associated with the application module in accordance with the received synchronization allotment, the synchronization protocol including one or more of a synchronization scope, a synchronization schedule, a synchronization duration, or a synchronization data quota; and
synchronizing, with the application module, data at the computing device with data located in a remote server via a computer network based on the scale synchronization protocol, wherein;
the application module includes a first sub-module and a second sub-module; the method further includes:
assigning a first portion of the received synchronization allotment to the first submodule;
assigning a second portion of the received synchronization allotment to the second sub-module; and
wherein the first portion is different than the second portion.

18. The method of claim 17, further comprising:
receiving an updated synchronization allotment; and in response to receiving the updated synchronization allotment, dynamically adjusting the synchronization protocol based on the received updated synchronization allotment.

19. The method of claim 17 wherein scaling the synchronization protocol includes one or more of:
a timing of synchronization;
a frequency of synchronization;
a scope of synchronization; or
a duration of synchronization of the data at the computing device with the data located in a remote server.

* * * * *